Patented Apr. 29, 1941

2,239,763

UNITED STATES PATENT OFFICE 2,239,763

VINYL ESTERS

Walter Julius Toussaint, South Charleston, W. Va., assignor to Carbide and Carbon Chemicals Corporation, a corporation of New York No Drawing. Application July 1, 1938, Serial No. 216,916

7 Claims. (Cl. 260—498)

This invention presents an improved process for producing vinyl esters through the reaction of acetylene with carboxylic acids.

The reaction of acetylene with carboxylic acids was first disclosed in 1913 by Klatte who indicated the general utility of mercuric compounds in conjunction with mineral acids as catalysts for the reaction. This reaction may be considered to proceed in two steps; the first step yielding a vinyl ester, the simple addition product of acetylene and the carboxylic acid; and the second step yielding a diester of the hypothetical ethylidene glycol, the addition product of the formed vinyl ester and another molecule of the acid. Since the invention of Klatte, many catalysts have been proposed for this reaction. Most of these catalysts, as well as those suggested by Klatte, promote the second step as well as the first step of this reaction with the resultant formation of large quantities of the ethylidene diester. Since, for many purposes, the vinyl esters are more useful than the ethylidene diesters, it is highly desirable that the vinyl esters constitute the principal portion of the reaction products. It has previously been proposed to inhibit the formation of ethylidene diesters by quickly removing the reaction products from the reaction zone.

The object of my invention is to provide a new catalyst for use in Klatte's process which is capable of promoting a rapid and efficient yield of vinyl ester. It is characteristic of my new process that the vinyl ester will constitute the principal part of the reaction products even though these products are permitted to remain in the reaction vessel for the duration of the reaction.

The catalyst is composed of acetylene disulfonic disulfuric acid, having the probable formula $(HOSO_3)_2HCCH(SO_3H)_2$, in conjunction with mercuric compounds. The catalyst acid may be prepared by passing acetylene through fuming sulfuric acid. For example, 182 parts of 45% fuming sulfuric acid were stirred at a temperature of 30° to 50° C. in an atmosphere of acetylene for about 6.4 hours. During this time 16.5 parts of acetylene were absorbed. In a concentration of 45% fuming sulfuric acid, by which is meant concentrated sulfuric acid containing 45% by weight excess sulfur trioxide, approximately equal molar ratios of sulfur trioxide and sulfuric acid are found. This concentration is therefore best adapted to assist the formation of acetylene disulfonic disulfuric acid from acetylene and fuming sulfuric acid. Other concentrations may be used such, for example, as 60% fuming sulfuric acid, and the catalyst acids thus prepared are about equally effective in promoting the reaction of acetylene with carboxylic acids.

The actual catalyst used for carrying out the reaction between acetylene and carboxylic acids to make vinyl esters may be made by precipitating mercury by means of acetylene passed into a solution of mercuric acetate in acetic acid (or other mercury carboxylate in the corresponding acid), and thereafter adding the catalyst acid. Alternatively, the catalyst acid may be first dissolved in acetic acid and acetylene passed into the solution for several minutes at a temperature of about 50° C. The solution of mercuric acetate in acetic acid is then added. Other methods of combining the catalyst acid with the mercury compounds may be used without departing from the invention. Best results are obtained when the amount of catalyst acid used is in stoichiometric excess of that required to react completely with the mercury compounds. This new catalyst is unusual in that it is efficacious in the presence of small percentages of water such as might be found in a commercial grade of the carboxylic acid used.

In operation, the reaction to obtain the vinyl esters may be carried out at temperatures of from about 15° to about 105° C. and preferably at a temperature of about 35° C. to about 50° C. Any of the known means of reacting acetylene with carboxylic acids may be used. For example, the carboxylic acid containing the catalyst may be saturated with acetylene, followed by distillation of the reaction mixture to isolate the product. Alternatively, the preparation of vinyl esters may be carried out continuously by passing an excess of acetylene through a body of carboxylic acid and the catalyst, and the vinyl ester formed in this manner may be recovered as a condensate from the effluent excess acetylene. The methods described in my Patent No. 2,186,437 may also be employed.

A few specific examples will now be given to illustrate the salient features of my invention. In these examples, proportions of materials are expressed gravimetrically. In each of the following examples, the preparation of vinyl acetate from acetic acid and acetylene will be described for comparative purposes, but it will be understood that other vinyl aliphatic esters can be similarly prepared by replacing acetic acid with formic, propionic, butyric or other carboxylic acid.

Example 1

In each experiment in the operation of the process, the mercuric oxide was dissolved in acetic acid and the mixture was treated with acetylene under stirring for 20 minutes at a temperature of 35° C. The catalyst acid was then added and the mixture stirred under acetylene at 35° C. for the period indicated. The amounts of acetylene absorbed during this period and for the first hour of operation are shown. The results indicate that the catalyst is active immediately upon preparation.

The products of the reaction were separated by distillation under vacuum.

In one experiment, namely, No. 3, 45% fuming sulfuric acid was used in place of the acetylene disulfonic disulfuric acid to afford a comparison of the results obtained when the catalyst acid of this invention is not employed.

|  | Experiment No. | | |
|---|---|---|---|
|  | 1 | 2 | 3 |
| Mercuric oxide, parts | 4 | 4 | 4 |
| Catalyst acid, parts | 8.2 | 4 |  |
| Composition as molar ratio $C_2H_2:H_2S_2O_7$ | 0.6:1 | 0.6:1 |  |
| Fuming sulfuric acid, parts |  |  | 7.5 |
| Acetic acid, parts | 395 | 403 | 399 |
| Temperature, °C | 35 | 35 | 35 |
| Duration, hours | 5 | 6 | 5 |
| Acetylene absorbed, parts: |  |  |  |
| First hour of operation | 24 | 10 | 14 |
| Total | 71 | 47 | 64 |
| Products, parts: |  |  |  |
| Vinyl acetate | 140 | 94 | 57 |
| Ethylidene diacetate | 64 | 46 | 155 |
| Efficiency—from acetylene absorbed: |  |  |  |
| To vinyl acetate, percent | 60 | 60 | 27 |
| To ethylidene diacetate, percent | 16 | 17 | 43 |

Example 2

The data below show the operation of my new process using another method of preparing the catalyst. In each case the catalyst acid was dissolved in acetic acid. This solution was treated with acetylene for 10 minutes at 50° C. The mercuric oxide in acetic acid was then added and the treatment with acetylene was continued. Rapid absorption of the gas took place immediately.

In one experiment the effect of a small amount of water on the efficacy of the catalyst is illustrated.

The reaction mixture was fractionated, as in Example 1, to recover the products.

|  | Experiment No. | |
|---|---|---|
|  | 4 | 5 |
| Mercuric oxide, parts | 4 | 4 |
| Catalyst acid, parts | 4 | 4 |
| Composition as molar ration $C_2H_2:H_2S_2O_7$ | 0.6:1 | 0.6:1 |
| Water, parts |  | 0.4 |
| Acetic acid, parts | 396 | 396 |
| Temperature, °C | 50 | 50 |
| Duration, hours | 4 | 5 |
| Acetylene absorbed, parts: |  |  |
| First hour of operation | 32 | 19 |
| Total | 71 | 57 |
| Products, parts: |  |  |
| Vinyl acetate | 158 | 138 |
| Ethylidene diacetate | 105 | 78 |
| Efficiency—from acetylene absorbed: |  |  |
| To vinyl acetate, percent | 67 | 74 |
| To ethylidene diacetate, percent | 27 | 24 |

Many modifications in the process described are possible without departing from the essential features of my invention, and such modifications are included within the invention as defined by the appended claims.

I claim:

1. Process which comprises reacting acetylene with a carboxylic acid in the presence of a mercury compound of acetylene disulfonic disulfuric acid.

2. Process which comprises reacting acetylene with a lower aliphatic acid in the presence of a mercury compound of acetylene disulfonic disulfuric acid.

3. Process for making vinyl esters which comprises reacting acetylene with carboxylic acids in the presence of a mercury compound of acetylene disulfonic disulfuric acid at a temperature between about 15° C. and about 105° C.

4. Process for making vinyl esters which comprises reacting acetylene with one of the group consisting of formic, acetic, propionic, and butyric acids in the presence of a mercury compound of an acid resulting from the direct addition of acetylene to fuming sulfuric acid.

5. Process for making vinyl acetate which comprises reacting acetylene with acetic acid in the presence of a mercury compound of an acid substantially identical with that resulting from the direct addition of about 182 parts of about 45% fuming sulfuric acid to about 16.5 parts of acetylene.

6. Process for making catalytically acting substances for promoting the reaction of acetylene with lower aliphatic acids which comprises treating a solution of a mercury compound in a lower aliphatic acid with acetylene and acetylene disulfonic disulfuric acid.

7. Process for making catalytically acting substances for promoting the reaction of acetylene with lower aliphatic acids which comprises dissolving acetylene disulfonic disulfuric acid in the lower aliphatic acid, treating the solution with acetylene, and thereafter adding a mercury compound to said solution.

WALTER JULIUS TOUSSAINT.